(12) United States Patent
Moeggenberg et al.

(10) Patent No.: US 11,221,068 B2
(45) Date of Patent: Jan. 11, 2022

(54) TRANSMISSION GRADE SENSOR RATIONALITY AND TRIM ALGORITHM

(71) Applicant: International Engine Intellectual Property Company, LLC, Lisle, IL (US)

(72) Inventors: Benjamin Edward Moeggenberg, Jonesville, MI (US); David William Slessor, Morrison, CO (US); Ravi Rayala, Aurora, IL (US)

(73) Assignee: International Engine Intellectual Property Company, LLC

( * ) Notice: Subject to any disclaimer, the term of this patent is extended or adjusted under 35 U.S.C. 154(b) by 504 days.

(21) Appl. No.: 16/206,210

(22) Filed: Nov. 30, 2018

(65) Prior Publication Data

US 2020/0173542 A1    Jun. 4, 2020

(51) Int. Cl.
| | |
|---|---|
| *F16H 59/62* | (2006.01) |
| *F16H 61/02* | (2006.01) |
| *F16H 59/44* | (2006.01) |
| *F16H 59/66* | (2006.01) |
| *B60K 20/00* | (2006.01) |
| *F16H 61/00* | (2006.01) |

(52) U.S. Cl.
CPC ......... *F16H 61/0213* (2013.01); *F16H 59/44* (2013.01); *F16H 59/62* (2013.01); *F16H 59/66* (2013.01); *B60K 20/00* (2013.01); *F16H 2059/663* (2013.01); *F16H 2061/0087* (2013.01); *F16H 2061/0234* (2013.01); *F16H 2708/22* (2013.01)

(58) Field of Classification Search
CPC .. F16H 61/0213; F16H 59/62; F16H 2059/62; F16H 2059/663
USPC ........................................................ 701/55
See application file for complete search history.

(56) References Cited

U.S. PATENT DOCUMENTS

| | | | |
|---|---|---|---|
| 7,841,455 B2 * | 11/2010 | Maki ..................... | F16H 61/061 192/3.58 |
| 8,606,483 B2 * | 12/2013 | Krupadanam ...... | F02D 41/0087 701/101 |
| 10,107,390 B2 * | 10/2018 | Zhao .................. | B60L 15/2009 |
| 2009/0187324 A1 * | 7/2009 | Lu ......................... | B60W 10/06 701/94 |
| 2010/0256883 A1 * | 10/2010 | Sauter ................ | F16H 61/0213 701/65 |
| 2015/0217766 A1 * | 8/2015 | Kelly ................. | F16H 61/0213 701/94 |

(Continued)

*Primary Examiner* — Charles A Fox
*Assistant Examiner* — Michael E Butler
(74) *Attorney, Agent, or Firm* — Jack D. Nimz; Mark C Bach

(57) ABSTRACT

A system for conducting a rationality check of a transmission grade sensor includes a controller configured to calculate a change in elevation over time based on a change in barometric pressure. The controller calculates another change in elevation based on an average grade determined from a transmission grade sensor. The controller compares the second change in elevation to the first change in elevation and, if there is a significant discrepancy between them, calculates a grade correction factor. The controller then modifies the shift logic and/or shift schedule of the transmission based on the average grade from the transmission grade sensor and on the grade correction factor.

13 Claims, 4 Drawing Sheets

(56) References Cited

U.S. PATENT DOCUMENTS

| | | | |
|---|---|---|---|
| 2015/0306957 A1* | 10/2015 | Sujan | B60W 30/143 |
| | | | 701/94 |
| 2015/0328983 A1* | 11/2015 | Takaira | B60K 17/354 |
| | | | 180/233 |
| 2016/0272208 A1* | 9/2016 | Yamanaka | B60W 30/18 |
| 2019/0039595 A1* | 2/2019 | Hawley | B60W 20/30 |
| 2020/0282999 A1* | 9/2020 | Mizrachi | B60W 40/08 |

* cited by examiner

TRANSMISSION GRADE SENSOR RATIONALITY AND TRIM ALGORITHM

BACKGROUND

This disclosure relates to ground vehicles, and in particular to commercial vehicles, in which a transmission grade sensor is used to provide terrain information to a transmission controller, in order to adjust the transmission shift schedule. Further, it relates to a Transmission Grade Sensor Rationality and Trim Algorithm, and method for the use thereof for such vehicles, which is used to verify the accuracy of the transmission grade sensor during operation.

RELATED ART

Commercial vehicles are large and heavy, and require particular attention by the operator in order to ensure safe operation. Increasingly, commercial vehicles such as Class 8 over the road trucks and highway tractors, as a non-limiting example, are provided with automatic transmissions or automated manual transmissions, in order to relieve the driver of the demands of operating a manual transmission. As a result, however, the driver's judgement in selecting an appropriate gear for the terrain has largely been overridden.

In order to compensate for this, it is known to use a transmission grade sensor in combination with modified transmission shift logic to alter the transmission shift schedule, in order to select more appropriate gears as the truck ascends or descends hills while driving. The accuracy of this transmission grade sensor, therefore, has a large impact on the ability of the transmission shift logic within transmission controller to select the correct transmission gear for the terrain. It is further known to manually calibrate the transmission grade sensor using a service tool. Even so, if the calibration of the transmission grade sensor is not done on a level surface, the transmission grade sensor output will be incorrect and the transmission will not perform correctly. The accuracy of the transmission grade sensor may also be affected by hardware changes on the truck, so that if such hardware changes occur, and the operator or mechanic fails to re-calibrate the transmission grade sensor or re-calibrates the transmission grade sensor improperly, this may also lead to transmission gear selection issues. Previously, therefore, the only method of verifying the accuracy of the transmission grade sensor is connecting the truck to a service tool, and hoping that the surface on which the truck rests is sufficiently level.

Accordingly, there is an unmet need for a system and method for verifying the accuracy of the transmission grade sensor in a commercial vehicle, in order to provide the transmission shift logic within the transmission controller more accurate grade information and allow it select gears more accurately for the terrain conditions.

SUMMARY

According to one embodiment of the Transmission Grade Sensor Rationality and Trim Algorithm, a vehicle has a system for conducting a rationality check of at least one transmission grade sensor. The vehicle has an engine and a multi-ratio transmission, and at least one controller connected to the at least one transmission grade sensor and to the engine and/or to the multi-ratio transmission. At least one barometric pressure sensor and at least one vehicle speed sensor is each connected to the at least one controller. The at least one controller is configured to calculate a first vehicle change in elevation over a time interval based on a change in barometric pressure determined from data reported by the at least one barometric pressure sensor. The at least one controller is further configured to calculate a second vehicle change in elevation over the time interval based on an average grade determined from data reported by the at least one transmission grade sensor, and on a distance travelled. The distance travelled is calculated from the length of the time interval and an average speed determined from data reported by the at least one vehicle speed sensor.

The at least one controller is further configured to compare the second vehicle change in elevation to the first vehicle change in elevation. The at least one controller is then configured, if there is a significant discrepancy between the second vehicle change in elevation and the first vehicle change in elevation, to calculate a grade correction factor. The grade correction factor is calculated based on a difference between a grade calculated from the first vehicle change in elevation and the distance travelled, and the average grade determined from the data reported by the at least one transmission grade sensor. The at least one controller is thereafter configured to modify shift logic and/or a shift schedule of the multi-ratio transmission based on the average grade determined from data reported by the at least one transmission grade sensor and on the grade correction factor.

According to another embodiment of the Transmission Grade Sensor Rationality and Trim Algorithm, a system for conducting a rationality check of at least one transmission grade sensor of a vehicle having an engine and a multi-ratio transmission, includes at least one controller connected to the at least one transmission grade sensor and to the engine and/or the multi-ratio transmission. At least one barometric pressure sensor and at least one vehicle speed sensor is each connected to the at least one controller. The at least one controller is configured to calculate a first vehicle change in elevation over a time interval based on a change in barometric pressure determined from data reported by the at least one barometric pressure sensor. The at least one controller is further configured to calculate a second vehicle change in elevation over the time interval based on an average grade determined from data reported by the at least one transmission grade sensor, and a distance travelled. The distance travelled is calculated from the length of the time interval and an average speed determined from data reported by the at least one vehicle speed sensor.

The at least one controller is further configured to compare the second vehicle change in elevation to the first vehicle change in elevation. The at least one controller is then configured, if there is a significant discrepancy between the second vehicle change in elevation and the first vehicle change in elevation, to calculate a grade correction factor. The grade correction factor is based on a difference between a grade calculated from the first vehicle change in elevation and the distance travelled, and the average grade determined from the data reported by the at least one transmission grade sensor. The at least one controller is thereafter configured to modify shift logic and/or a shift schedule of the multi-ratio transmission based on the average grade determined from data reported by the at least one transmission grade sensor and on the grade correction factor.

According to another embodiment of the Transmission Grade Sensor Rationality and Trim Algorithm, a method for conducting a rationality check of at least one transmission grade sensor of a vehicle having an engine and a multi-ratio transmission includes several steps. The first step is connecting at least one controller to the at least one transmission grade sensor and to the engine and/or to the multi-ratio transmission. The second step is connecting at least one barometric pressure sensor and at least one vehicle speed sensor to the at least one controller. The third step is configuring the at least one controller to take several sub-steps.

The first sub-step is determining an average grade from data reported by the at least one transmission grade sensor. The second sub-step is determining an average speed from data reported by the at least one vehicle speed sensor. The third sub-step is calculating a distance travelled from the length of a time interval and the average speed. The fourth sub-step is determining a change in barometric pressure from data reported by the at least one barometric pressure sensor. The fifth sub-step is calculating a first vehicle change in elevation over the time interval based on the change in barometric pressure. The sixth sub-step is calculating a grade from the first vehicle change in elevation and the distance travelled. The seventh sub-step is calculating a second vehicle change in elevation over the time interval based on the average grade and the distance travelled. The eighth sub-step is comparing the second vehicle change in elevation to the first vehicle change in elevation.

If there is a significant discrepancy between the second vehicle change in elevation and the first vehicle change in elevation, the at least one controller is configured to take an additional sub-step of calculating a grade correction factor. The grade correction factor is based on a difference between the grade calculated from the first vehicle change in elevation and the distance travelled, and the average grade determined from the data reported by the at least one transmission grade sensor. The final step is modifying at least one of shift logic and a shift schedule of the multi-ratio transmission based on the average grade determined from data reported by the at least one transmission grade sensor and on the grade correction factor.

DETAILED DESCRIPTION

Figure 1:
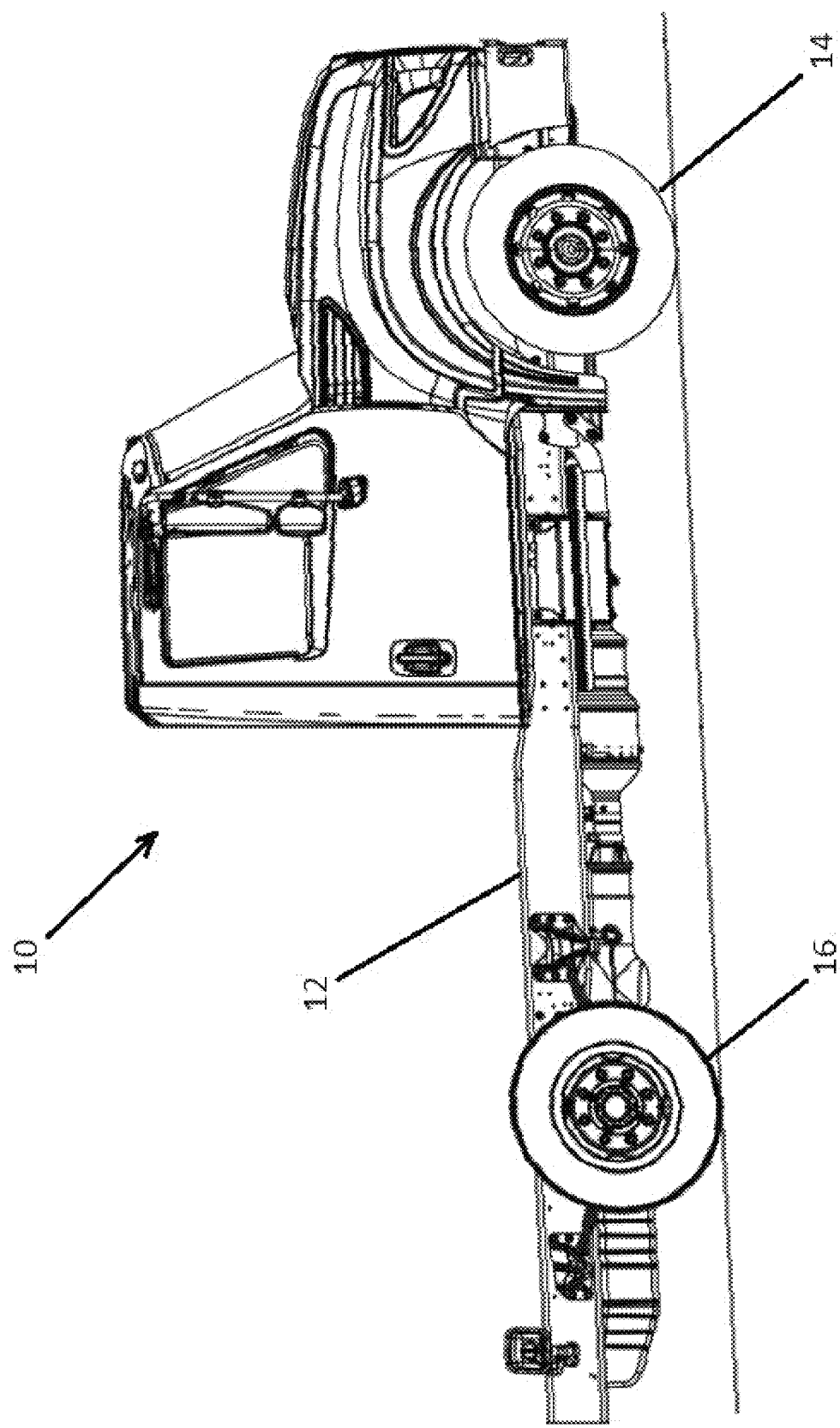
FIG. 1 is a right hand view of a vehicle having an embodiment of a Transmission Grade Sensor Rationality and Trim Algorithm, as described herein.

Embodiments described herein relate to a Transmission Grade Sensor Rationality and Trim Algorithm and methods for the use thereof. The system and method may be applied to various types of commercial vehicles and recreational vehicles, such as highway or semi-tractors, straight trucks, busses, fire trucks, agricultural vehicles, motorhomes, rail travelling vehicles, and etcetera, having an automatic or automated manual transmission. It is further contemplated that embodiments of the Transmission Grade Sensor Rationality and Trim Algorithm and methods for the use thereof may be applied to vehicles having other types of transmissions, such as continuously variable transmissions, hybrid electric transmissions, and hydraulic transmissions, as non-limiting examples. The several embodiments of the Transmission Grade Sensor Rationality and Trim Algorithm and method for the use thereof presented herein are employed on vehicles having a drivetrain including a diesel or gas engine, but this is not to be construed as limiting the scope of the system and method, which may be applied to vehicles and engines or motors of differing construction.

Embodiments of the Transmission Grade Sensor Rationality and Trim Algorithm and methods for the use thereof disclosed herein reside at least in part as software or firmware on an engine controller or a transmission controller, and use an engine barometric pressure sensor, a vehicle speed sensor, and a hypsometric formula to calculate a change in the elevation of the vehicle over time based on barometric pressure. This change in elevation is then compared to an elevation change over time as calculated using input from a transmission grade sensor and from the vehicle speed sensor, in order to verify and/or calibrate the transmission grade sensor. A calculated grade correction factor is then verified and stored in the engine controller or transmission controller. The calculated grade correction factor may be used to continuously adjust the output of the transmission grade sensor, or may be used to automatically adjust the transmission grade sensor itself in order to eliminate calibration error. Embodiments of the Transmission Grade Sensor Rationality and Trim Algorithm may run upon demand of an operator, may run periodically, or may run continuously, thereby updating the calculated grade correction factor regularly over the life of the vehicle.

Embodiments of the Transmission Grade Sensor Rationality and Trim Algorithm may be written using a technical computing environment, such as MATLAB® from The MathWorks®, Inc. of Natick, Mass., as a non-limiting example, and then converted into executable software or firmware that resides at least in part as software on the engine controller or transmission controller. Further, embodiments of the Transmission Grade Sensor Rationality and Trim Algorithm and methods for the use thereof may incrementally adjust the calculated grade correction factor in a recursive process, until the change in altitude predicted by a transmission grade sensor delta height calculation using data from the transmission grade sensor adjusted by the calculated grade correction factor and data from the vehicle speed sensor consistently matches the change in altitude determined using data from the engine barometric pressure sensor. This may occur automatically, as noted previously, thereby improving transmission shift quality and consistency.

Embodiments of the Transmission Grade Sensor Rationality and. Trim Algorithm and methods for the use thereof may continue to use the calculated grade correction factor to modify the data coming from the transmission grade sensor. Alternately, the transmission grade sensor may be capable of self-adjustment and calibration, so that the transmission grade sensor is adjusted by the controller or controllers running the Transmission Grade Sensor Rationality and Trim Algorithm according to the calculated grade correction factor until the data coming from the transmission grade sensor is corrected. Additionally, embodiments of the Transmission Grade Sensor Rationality and Trim Algorithm and methods for the use thereof may set a fault indication within the engine controller and/or transmission controller, or elsewhere within the vehicle controls, if the change in altitude predicted by a transmission grade sensor delta height calculation is sufficiently different, i.e.—statistically significant in its difference or different in excess of a preset threshold, from the change in altitude determined using data from the engine barometric pressure sensor. The fault indication may thereby alert an operator or mechanic of the need to manually recalibrate the transmission grade sensor. Additionally, the fault indication may function as a rationality check of the transmission grade sensor for the purpose of On-Board Diagnostics (OBD) if the transmission grade sensor becomes subject to OBD monitoring, for non-limiting example in satisfaction of an OBDII monitoring requirement.

Figure 2:
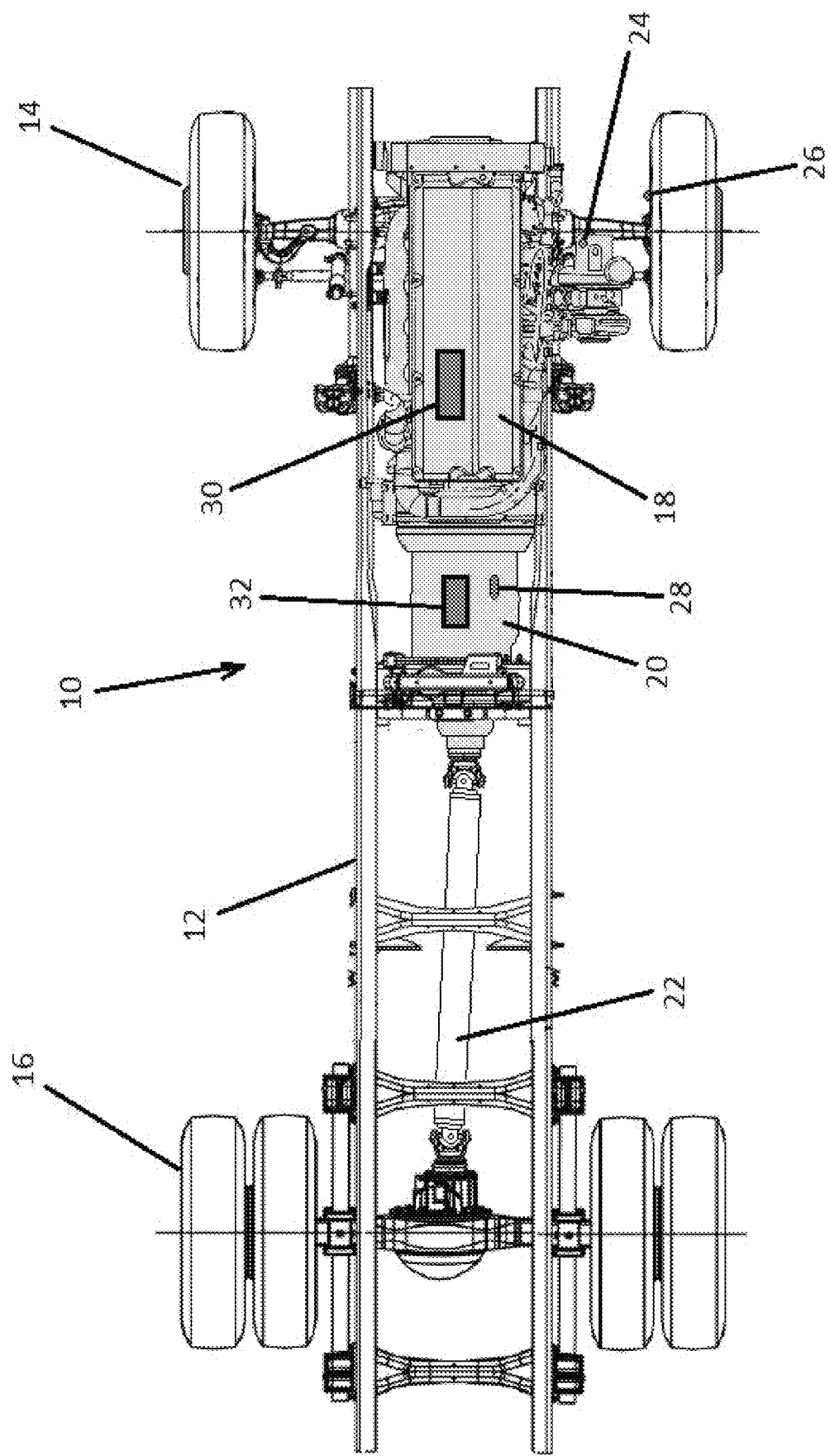
FIG. 2 is a top view of a chassis of a vehicle having an embodiment of a Transmission Grade Sensor Rationality and Trim Algorithm, as described herein.

Referring now to FIGS. 1 and 2, a right hand view of a vehicle 10 having an embodiment of a Transmission Grade Sensor Rationality and Trim Algorithm, and a top view of a chassis 12 of a vehicle 10 having an embodiment of a Transmission Grade Sensor Rationality and Trim Algorithm are shown, respectively. The chassis 12 of the vehicle 10 is provided with an engine 18 for producing propulsive power, an automatic or automated manual transmission 20 for transmitting power to a driveline 22 while keeping the engine 18 in an appropriate power band, and a driveline 22 for transmitting power to a rear axle 16 and/or to a front axle 14. The engine 18 of the vehicle 10 may be provided with an engine controller 30 for controlling, monitoring, and diagnosing various functions of the engine 18. Similarly, the automatic or automated manual transmission 20 may be provided with a transmission controller 32 for controlling, monitoring, and diagnosing various functions of the automatic or automated manual transmission 20.

If both engine controller 30 and transmission controller 32 are provided for controlling, monitoring, and diagnosing various functions of the engine 18 and of the automatic or automated manual transmission 20, respectively, the engine controller 30 and transmission controller 32 may be connected to each other for the purpose of transmitting data and information therebetween, typically by way of a data bus (not shown) The engine controller 30 may further be connected to an engine barometric pressure sensor 24, data from which may be used by the engine controller 30 in controlling, monitoring, and diagnosing various functions of the engine 18. Alternately, the barometric pressure sensor 24 may a standalone sensor provided specifically for the purposes of the Transmission Grade Sensor Rationality and Trim Algorithm, and may be connected to the engine controller 30 solely for this purpose, to the transmission controller 32 solely for this purpose, or otherwise to other chassis subsystems for additional purposes.

Similarly, the engine controller 30 and/or the transmission controller 32 may be connected to a vehicle speed sensor 26, data from which may be used by the engine controller 30 in controlling, monitoring, and diagnosing various functions of the engine 18, and/or by the transmission controller 32 in controlling, monitoring, and diagnosing various functions of the automatic or automated manual transmission 20. The engine controller 30 and/or the transmission controller 32 may further be connected to a transmission grade sensor 28, data from which may also be used by the engine controller 30 in controlling, monitoring, and diagnosing various functions of the engine 18, and/or by the transmission controller 32 in controlling, monitoring, and diagnosing various functions of the automatic or automated manual transmission 20. In particular, the transmission controller 30 may use data from the transmission grade sensor 28 to modify the transmission shift logic and alter the transmission shift schedule, in order to select more appropriate gears as the vehicle 10 ascends or descends hills while driving.

Figure 3:
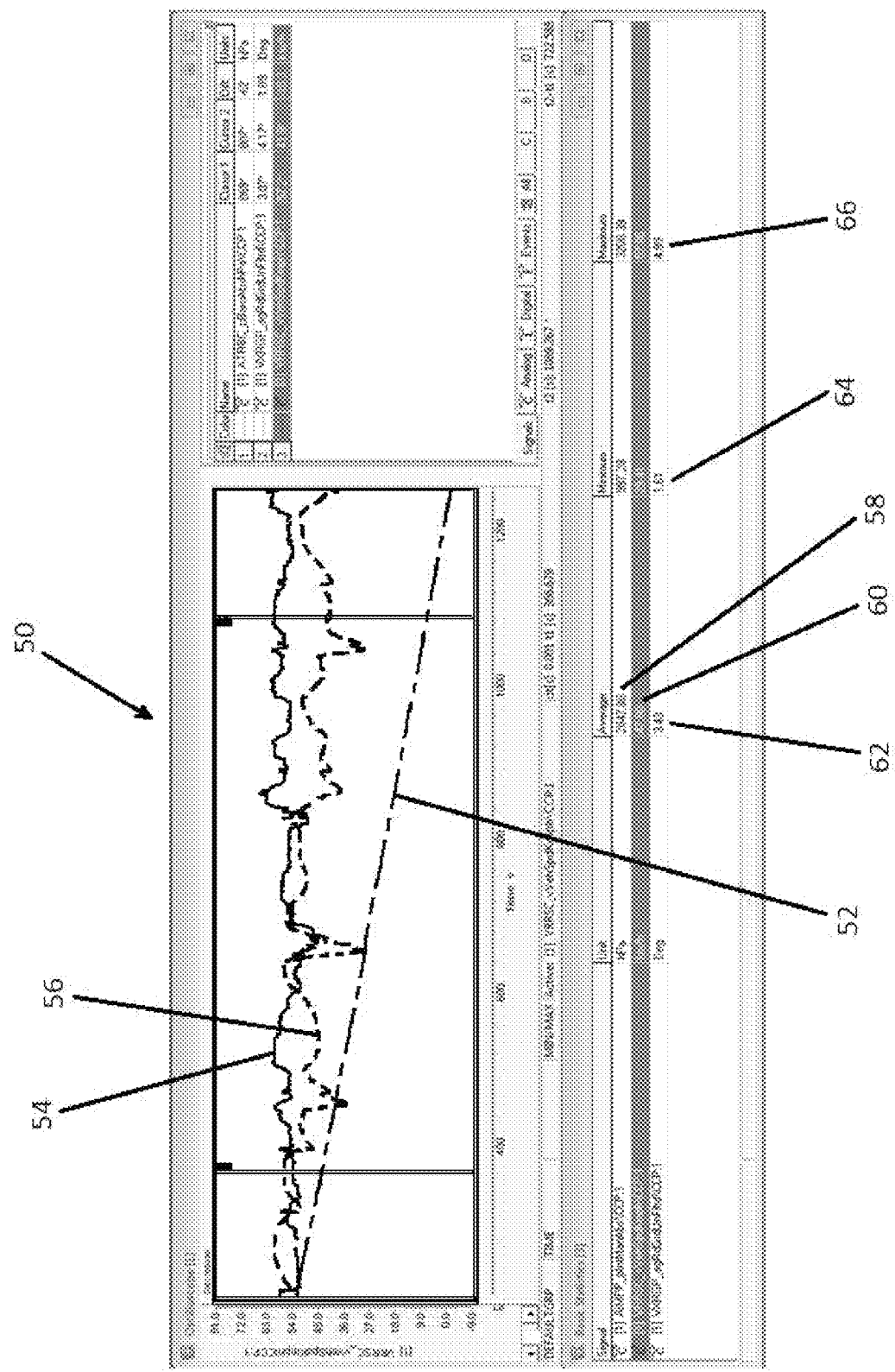
FIG. 3 is a graphical representation of an embodiment of a Transmission Grade Sensor Rationality and Trim Algorithm, as described herein.
Figure 4:
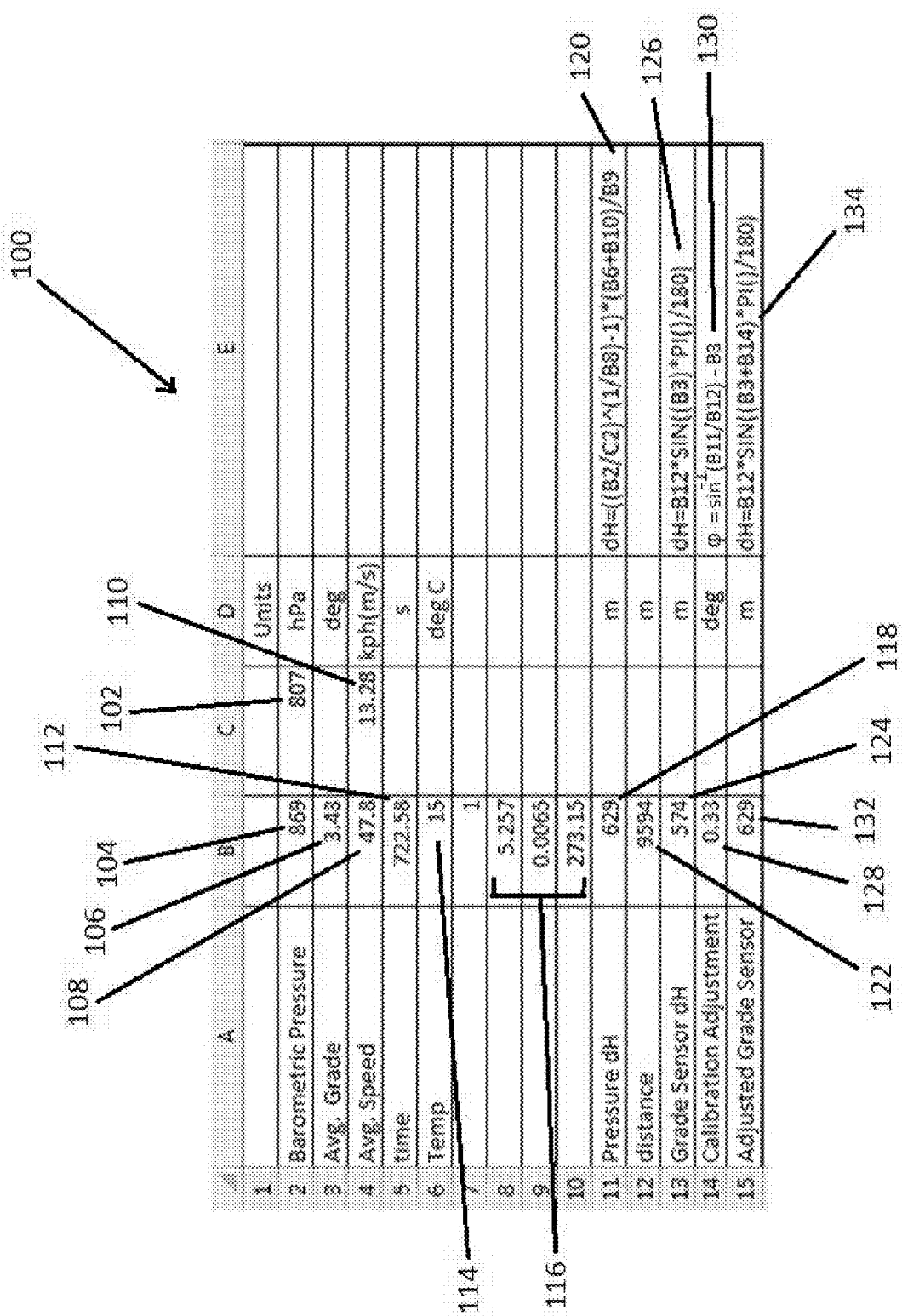
FIG. 4 is a graphical representation of an embodiment of a Transmission Grade Sensor Rationality and Trim Algorithm, as described herein.

Turning now to FIGS. 3 and 4, graphical representations of an embodiment of a Transmission Grade Sensor Rationality and Trim Algorithm 100 are shown, which may reside upon the engine controller 30 (not shown) and/or upon the transmission controller 32 (not shown). FIG. 3 shows the collection of vehicle data 50 from the engine barometric pressure sensor 24 (not shown), from the vehicle speed sensor 26 (not shown), and from the transmission grade sensor 28 (not shown) by at least one of the engine controller 30 (not shown) and/or the transmission controller 32 (not shown). Data from the engine barometric pressure sensor 24 is represented by a barometric pressure line 52, which is averaged by the embodiment of the Transmission Grade Sensor Rationality and Trim Algorithm 100 to produce an average barometric pressure 58. Data from the vehicle speed sensor 26 is represented by a vehicle speed line 56, which is averaged to produce an average vehicle speed 60. Data from the transmission grade sensor 28 is represented by a transmission grade sensor line 54, which is averaged to produce an average transmission grade sensed 62. Minimum values 64 and maximum values 66 for the data from the engine barometric pressure sensor 24, from the vehicle speed sensor 26, and from the transmission grade sensor 28 are also determined by the embodiment of the Transmission Grade Sensor Rationality and Trim Algorithm 100.

FIG. 4 shows a graphical representation of calculations performed by an embodiment of the Transmission Grade Sensor Rationality and Trim Algorithm 100, which may again reside upon the engine controller 30 (not shown) and/or the transmission controller 32 (not shown). First, the embodiment of the Transmission Grade Sensor Rationality and Trim Algorithm 100 determines the initial barometric pressure 102 in hectopascals (hPa) and the final barometric pressure 104 in hPa for the interval being analyzed, as reported by the engine barometric pressure sensor 24 (not shown). Second, the embodiment of the Transmission Grade Sensor Rationality and Trim Algorithm 100 determines the reported average grade 106 in degrees as provided from the vehicle data 50 at average transmission grade sensed 62. Third, the embodiment of the Transmission Grade Sensor Rationality and Trim Algorithm 100 determines the reported average speed 108 in kilometers per hour (kph) as provided from the vehicle data 50 at average vehicle speed 60, which is then converted to reported average speed 110 in meters per second (mps). Fourth, the embodiment of the Transmission Grade Sensor Rationality and Trim Algorithm 100 determines the time 112 in seconds elapsed during the interval being analyzed, and the temperature 114 in degrees Celsius (C).

Next, the embodiment of the Transmission Grade Sensor Rationality and Trim Algorithm 100 applies the hypsometric formula 120 based on hydraulic formulas and the ideal gas law, which may be represented as:

$$h = \frac{\left(\left(\frac{P_0}{P}\right)^{\frac{1}{5.257}} - 1\right) \times (T - 273.15)}{0.0065}.$$ Hypsometric Formula Using the hypsometric formula 120, the embodiment of the Transmission Grade Sensor Rationality and Trim Algorithm 100 calculates a pressure delta height 118 in meters (m), in the illustrated example as follows:

Pressure delta height 118 (m)=((final barometric pressure 104 (hPa)/initial barometric pressure 102 (hPa))^(1/5.257)−1)×(temperature 114 (deg C.)+273.15)/0.0065 or dH=((869/807)^(1/5.257)−1)×(15+273.15)/ 0.0065=629.2 (m)

Next, the embodiment of the Transmission Grade Sensor Rationality and Trim Algorithm 100 determines the distance 122 travelled by the vehicle 10 during the interval being analyzed by multiplying the time 112 in seconds elapsed by the reported average speed 110 in mps, in the illustrated example as follows:

Distance 122 (m)=13.28×722.58=9595.9

Next, the embodiment of the Transmission Grade Sensor Rationality and Trim Algorithm 100 calculates a transmission grade sensor delta height 124 in meters as would be predicted by the reported average grade 106, which was provided from the vehicle data 50 as average transmission grade sensed 62 obtained from the transmission grade sensor 28. In the illustrated example, this is accomplished using the transmission grade sensor delta height trigonometric calculation 126, as follows:

transmission grade sensor delta height 124 (m)=distance 122 (m)×sin(reported average grade 106 (deg))

or dH=9595.9×sin 3.43 (deg)=574.1

The Transmission Grade Sensor Rationality and Trim Algorithm 100 then compares the transmission grade sensor delta height 124 with the pressure delta height 118. If there is a significant discrepancy, i.e.—a discrepancy that is statistically significant given the quantity and quality of the data and given the accuracy of the measurements, or if the discrepancy meets a minimum threshold preset within the at least one controller, the embodiment of the Transmission Grade Sensor Rationality and Trim Algorithm 100 calculates a transmission grade sensor error or grade correction factor 128 in degrees, using a transmission grade sensor error or grade correction factor trigonometric calculation 130, as follows:

transmission grade sensor error or grade correction factor 128 (deg)=sin$^{-1}$(Pressure delta height 118 (m)/distance 122 (m))−reported average grade 106 (deg)

or $\varphi$=sin$^{-1}$(629.2/9595.9)−3.43=0.33

An adjusted transmission grade sensor delta height 132 in meters may now be verified using an adjusted transmission grade sensor delta height trigonometric calculation 134, as follows:

adjusted transmission grade sensor delta height 132 (m)=distance 122 (m)×sin(reported average grade 106 (deg)+transmission grade sensor error or grade correction factor 128 (deg))

or dH=9595.9×sin(3.43+0.33)=629.3

This matches the pressure delta height 118 calculated using the hypsometric formula 120 above, thereby verifying that the transmission grade sensor error or grade correction factor 128 is correct.

While the Transmission Grade Sensor Rationality and Trim Algorithm, and methods for the use thereof, has been described with respect to at least one embodiment, the system and method can be further modified within the spirit and scope of this disclosure, as demonstrated previously. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

What is claimed is:

1. A vehicle having a system for conducting a rationality check of at least one transmission grade sensor, comprising:
   an engine and a multi-ratio transmission;
   at least one controller connected to the at least one transmission grade sensor and to at least one of the engine and the multi-ratio transmission;
   at least one barometric pressure sensor and at least one vehicle speed sensor each connected to the at least one controller;
   the at least one controller being configured to calculate a first vehicle change in elevation over a time interval by determining an initial barometric pressure and a final barometric pressure from data provided by the at least one barometric pressure sensor, by determining an ambient temperature, and by applying a hypsometric formula;
   the at least one controller being configured to calculate a second vehicle change in elevation over the time interval by multiplying:
   the sine of an average grade determined from data reported by the at least one transmission grade sensor; and
   a distance travelled calculated from the length of the time interval and an average speed determined from data reported by the at least one vehicle speed sensor;
   the at least one controller being configured to compare the second vehicle change in elevation to the first vehicle change in elevation;
   the at least one controller being configured, if the discrepancy between the second vehicle change in elevation and the first vehicle change in elevation meets or exceeds a preset minimum threshold within the at least one controller, to calculate a grade correction factor based on a difference between:
   a grade calculated by taking the inverse sine of the first vehicle change in elevation divided by the distance travelled; and
   the average grade determined from the data reported by the at least one transmission grade sensor;
   the at least one controller being configured to modify at least one of shift logic and a shift schedule of the multi-ratio transmission based on the average grade determined from data reported by the at least one transmission grade sensor and on the grade correction factor; and
   the at least one controller being further configured to verify the grade correction factor by calculating an adjusted vehicle change in elevation over the time interval by multiplying the distance traveled by the sine of the sum of the grade correction factor and the average grade determined from data reported by the at least one transmission grade sensor, adjusted by the grade correction factor, and on the distance travelled, and by comparing the result to the first vehicle change in elevation based on the change in barometric pressure reported by the at least one barometric pressure sensor.

2. The vehicle of claim 1, wherein:
   the at least one controller being further configured to at least one of:

incrementally adjust the grade correction factor in a recursive process, continually apply the grade correction factor to modify the average grade determined from data reported by the at least one transmission grade sensor, automatically self-adjust or calibrate the at least one transmission grade sensor based on the grade correction factor, and set a fault indication within the at least one controller if the discrepancy between the second vehicle change in elevation and the first vehicle change in elevation meets or exceeds the preset minimum threshold.

3. The vehicle of claim 1, wherein:
the at least one controller further comprises at least one of an engine controller and a transmission controller.

4. The vehicle of claim 1, wherein:
the at least one controller being further configured to calculate the first vehicle change in elevation, to calculate the second vehicle change in elevation, to compare the second vehicle change in elevation to the first vehicle change in elevation, and to calculate a grade correction factor if the discrepancy between the second vehicle change in elevation and the first vehicle change in elevation meets or exceeds the preset minimum threshold, at least one of:
upon demand of an operator,
periodically, and
continuously.

5. The vehicle of claim 1, wherein:
the multi-ratio transmission being one of:
automatic,
automated manual,
continuously variable,
hybrid electric, and
hydraulic.

6. A system for conducting a rationality check of at least one transmission grade sensor of a vehicle having an engine and a multi-ratio transmission, comprising:
at least one controller connected to the at least one transmission grade sensor and to at least one of the engine and the multi-ratio transmission, and;
at least one barometric pressure sensor and at least one vehicle speed sensor each connected to the at least one controller;
the at least one controller being configured to calculate a first vehicle change in elevation over a time interval by determining an initial barometric pressure and a final barometric pressure from the data provided by the at least one barometric pressure sensor, by determining an ambient temperature, and by applying a hypsometric formula;
the at least one controller being configured to calculate a second vehicle change in elevation over the time interval by multiplying:
the sine of an average grade determined from data reported by the at least one transmission grade sensor; and
a distance travelled calculated from the length of the time interval and an average speed determined from data reported by the at least one vehicle speed sensor;
the at least one controller being configured to compare the second vehicle change in elevation to the first vehicle change in elevation;
the at least one controller being configured, if the discrepancy between the second vehicle change in elevation and the first vehicle change in elevation meets or exceeds a preset minimum threshold, to calculate a grade correction factor based on a difference between:
a grade calculated by taking the inverse sine of the first vehicle change in elevation divided by the distance travelled; and
the average grade determined from the data reported by the at least one transmission grade sensor;
the at least one controller being configured to modify at least one of shift logic and a shift schedule of the multi-ratio transmission based on the average grade determined from data reported by the at least one transmission grade sensor and on the grade correction factor; and
the at least one controller being further configured to verify the grade correction factor by calculating an adjusted vehicle change in elevation over the time interval by multiplying the distance traveled by the sine of the sum of the grade correction factor and the average grade determined from data reported by the at least one transmission grade sensor, adjusted by the grade correction factor, and on the distance travelled, and by comparing the result to the first vehicle change in elevation based on the change in barometric pressure reported by the at least one barometric pressure sensor.

7. The system of claim 6, wherein:
the at least one controller being further configured to at least one of:
incrementally adjust the grade correction factor in a recursive process,
continually apply the grade correction factor to modify the average grade determined from data reported by the at least one transmission grade sensor,
automatically self-adjust or calibrate the at least one transmission grade sensor based on the grade correction factor, and
set a fault indication within the at least one controller if the discrepancy between the second vehicle change in elevation and the first vehicle change in elevation meets or exceeds the preset minimum threshold.

8. The system of claim 6, wherein:
the at least one controller further comprises at least one of an engine controller and a transmission controller.

9. The system of claim 6, wherein:
the at least one controller being further configured to calculate the first vehicle change in elevation, to calculate the second vehicle change in elevation, to compare the second vehicle change in elevation to the first vehicle change in elevation, and to calculate a grade correction factor if the discrepancy between the second vehicle change in elevation and the first vehicle change in elevation meets or exceeds the preset minimum threshold, at least one of:
upon demand of an operator,
periodically, and
continuously.

10. A method for conducting a rationality check of at least one transmission grade sensor of a vehicle having an engine and a multi-ratio transmission, comprising the steps of:
connecting at least one controller to the at least one transmission grade sensor and to at least one of the engine and the multi-ratio transmission;
connecting at least one barometric pressure sensor and at least one vehicle speed sensor to the at least one controller;
configuring the at least one controller to:
determine an average grade from data reported by the at least one transmission grade sensor;

determine an average speed from data reported by the at least one vehicle speed sensor;

calculate a distance travelled from the length of a time interval and the average speed;

determine a change in barometric pressure from data reported by the at least one barometric pressure sensor;

calculate a first vehicle change in elevation over the time interval based on the change in barometric pressure, by determining an ambient temperature, and by applying a hypsometric formula;

calculate a grade from the first vehicle change in elevation and the distance travelled;

calculate a second vehicle change in elevation over the time interval by multiplying the sine of the average grade by the distance travelled;

compare the second vehicle change in elevation to the first vehicle change in elevation;

if the discrepancy between the second vehicle change in elevation and the first vehicle change in elevation meets or exceeds a preset minimum threshold, calculate a grade correction factor based on a difference between:

the grade calculated by taking the inverse sine of the first vehicle change in elevation divided by the distance travelled; and the average grade determined from the data reported by the at least one transmission grade sensor;

modify at least one of shift logic and a shift schedule of the multi-ratio transmission based on the average grade determined from data reported by the at least one transmission grade sensor and on the grade correction factor; and configuring the at least one controller to verify the grade correction factor by:

calculating an adjusted vehicle change in elevation over the time interval by multiplying the sine of the sum of the average grade determined from data reported by the at least one transmission grade sensor and the grade correction factor, and the distance travelled, and comparing the adjusted vehicle change in elevation to the first vehicle change in elevation based on the change in barometric pressure reported by the at least one barometric pressure sensor.

11. The method of claim 10, further comprising the steps of:

configuring the at least one controller to at least one of:

incrementally adjust the grade correction factor in a recursive process, continually apply the grade correction factor to modify the average grade determined from data reported by the at least one transmission grade sensor, automatically self-adjust or calibrate the at least one transmission grade sensor based on the grade correction factor, and set a fault indication within the at least one controller if the discrepancy between the second vehicle change in elevation and the first vehicle change in elevation meets or exceeds the, preset minimum threshold.

12. The method of claim 10, wherein:

the at least one controller further comprises at least one of an engine controller and a transmission controller.

13. The method of claim 10, further comprising the steps of:

configuring the at least one controller to calculate the first vehicle change in elevation, to calculate the second vehicle change in elevation, to compare the second vehicle change in elevation to the first vehicle change in elevation, and to calculate a grade correction factor if the discrepancy between the second vehicle change in elevation and the first vehicle change in elevation meets or exceeds the preset minimum threshold, at least one of:

upon demand of an operator, periodically, and continuously.

* * * * *